United States Patent
Åström et al.

(10) Patent No.: US 10,965,729 B2
(45) Date of Patent: Mar. 30, 2021

(54) LIVE STREAMING OF MEDIA FOR LOW-LATENCY APPLICATIONS SUCH AS LIVE CASINO GAMING APPLICATIONS

(71) Applicant: NETENT PRODUCT SERVICES LTD., Ta' Xbiex (MT)

(72) Inventors: Niclas Åström, Umeå (SE); Per Mafrost, Hörnefors (SE); Mattias Bergström, Umeå (SE); Ulf Bertilsson, Umeå (SE)

(73) Assignee: NETENT PRODUCT SERVICES LTD., Ta'Xbiex (MT)

( * ) Notice: Subject to any disclaimer, the term of this patent is extended or adjusted under 35 U.S.C. 154(b) by 43 days.

(21) Appl. No.: 16/305,258

(22) PCT Filed: Jun. 14, 2016

(86) PCT No.: PCT/EP2016/063552
§ 371 (c)(1),
(2) Date: Nov. 28, 2018

(87) PCT Pub. No.: WO2017/215733
PCT Pub. Date: Dec. 21, 2017

(65) Prior Publication Data
US 2020/0177659 A1   Jun. 4, 2020

(51) Int. Cl.
*G06F 15/16* (2006.01)
*H04L 29/06* (2006.01)
*G07F 17/32* (2006.01)

(52) U.S. Cl.
CPC ........ *H04L 65/608* (2013.01); *G07F 17/3223* (2013.01); *G07F 17/3225* (2013.01); *H04L 65/601* (2013.01); *H04L 65/607* (2013.01)

(58) Field of Classification Search
USPC .......... 709/231, 236, 201, 202, 203
See application file for complete search history.

(56) References Cited

U.S. PATENT DOCUMENTS

| 2008/0117287 A1* | 5/2008 | Park ................. G06T 7/80 348/36 |
| 2013/0042015 A1* | 2/2013 | Begen ............. H04N 21/6125 709/231 |

(Continued)

FOREIGN PATENT DOCUMENTS

| EP | 1395020 A2 | 3/2004 |
| EP | 2866456 A1 | 4/2015 |

(Continued)

OTHER PUBLICATIONS

Anonymous "WebRTC (Web Real-Time Communication)", Wikipedia, the free encyclopedia (2016), retrieved from the Internet on Mar. 7, 2017.

(Continued)

*Primary Examiner* — Lan Dai T Truong
(74) *Attorney, Agent, or Firm* — Merchant & Gould P.C.

(57) ABSTRACT

The present disclosure generally relates to streaming of media and, more specifically, to live streaming of media. The present disclosure relates, in particular, to live streaming of media for low-latency applications such as gaming applications (e.g., live casino gaming applications). The disclosure, among other things, describes a method of live streaming of media for low-latency applications, wherein the media streams are broadcasted (220) from a first device (e.g., a Media Streaming Provider Server System (140)) to one or several second devices (e.g., user game devices (110) for use in a live casino gaming application) over a WebRTC data channel.

44 Claims, 7 Drawing Sheets

(56) References Cited

U.S. PATENT DOCUMENTS

| | | | |
|---|---|---|---|
| 2015/0149565 A1* | 5/2015 | Ahmed | H04L 51/04 |
| | | | 709/206 |
| 2016/0192029 A1* | 6/2016 | Bergstrom | H04N 21/6125 |
| | | | 725/109 |
| 2017/0124664 A1* | 5/2017 | Savenok | H04L 63/10 |
| 2017/0180824 A1* | 6/2017 | Casey | H04N 21/8455 |

FOREIGN PATENT DOCUMENTS

| | | |
|---|---|---|
| WO | 2014/067911 A1 | 5/2014 |
| WO | 2015/038722 A1 | 3/2015 |
| WO | 2015/038997 A1 | 3/2015 |

OTHER PUBLICATIONS

Int'l Search Report and Written Opinion for PCT/EP2016/063552, dated Mar. 31, 2017.

Int'l Preliminary Report on Patentability for PCT/EP2016/063552, dated Aug. 9, 2018.

Westerlund M. et al., "RTP usage in WebRTC Part 1: API and Topologies draft-ietf-rtcweb-rtp-usage-03 RTCWEB Interim Jun. 2012", (Jun. 1, 2012), retrieved from the Internet: URL:https://csperkins.org/standards/ietf-81/2012-06-12-IETF81-RTCWeb-interim-rtp-usage-1.pdf. [retrieved on Sep. 15, 2020].

"Real-time Transport Protocol", Wikipedia, (May 1, 2016), Retrieved from the Internet: URL:https://web.archive.org/web/20160501114951/https://en.wikipedia.org/wiki/Real-time_Transport_Protocol [retrieved on Jun. 15, 2020].

Communication pursuant to Article 94(3)EPC for European Patent Application No. 16730328.8, dated Sep. 18, 2020.

\* cited by examiner

LIVE STREAMING OF MEDIA FOR LOW-LATENCY APPLICATIONS SUCH AS LIVE CASINO GAMING APPLICATIONS This application is a National Stage Application of PCT/EP2016/063552, filed Jun. 14, 2016, which application is incorporated herein by reference. To the extent appropriate, a claim of priority is made to the above disclosed application.

TECHNICAL FIELD

The present disclosure generally relates to streaming of media and, more specifically, to live streaming of media. As used throughout this disclosure, live streaming of media may e.g. include streaming of media in real time or in substantially real time.

The live streaming may be from a single first device to several second devices. In other words, the live streaming may be broadcasted live streaming.

More particularly, the present disclosure relates to live streaming of media for low-latency applications. The present disclosure therefore presents methods, systems, devices, computer program products, and apparatuses, etc., for live streaming of media for low-latency applications.

The present disclosure focuses particularly on gaming applications such as live casino gaming applications. However, gaming applications such as live casino gaming applications is just one example of a low-latency application where embodiments of the invention may be advantageously reduced to practice. Hence, the example of gaming applications should be seen as an example and this should not be construed as limiting the scope of the present disclosure.

BACKGROUND

Gaming is an increasingly popular activity and is growing in number of participants globally. In particular, games available at casinos are receiving increased attention. Casino games typically involve a game leader, such as a dealer or croupier, a gaming device and game users, or players.

In order to facilitate the opportunity to participate in casino games for game users unable or unwilling to travel to a casino, network based non-live casinos have been introduced. In a network based non-live casino the game user interacts with a system where the casino environment is animated and oriented towards game user versus system gaming.

In order to further enhance the player experience, live casino gaming has also been introduced in recent years. In live casino gaming, part of the content or all of the content presented to the game user is live. If not all of the content is live, part of the content presented to the game user may be animated. The live part of the content typically comprises physical persons interacting with physical gaming devices and the recording of the interaction e.g. in a micro studio located in a larger studio. To facilitate multiple players, multiple micro studios may hence be located within a larger studio. The environment of a network based live casino differs significantly from the setting of a normal casino. The players at a live network based casino use a player client to communicate with the network based live casino and could be located anywhere where they can access a communications network, e.g. the Internet. The live content may be produced in a studio that comprises multiple instances of a game leader, a gaming device and recording equipment for recording game play. The live network based live casino may also comprise control logic to handle game users, predefined content and live content. In addition, the system may comprise at least a node for each casino operator hosting game user accounts and winnings and/or earnings information.

The international patent application PCT/EP2013/072541, published under WO2014/067911A1 on May 8, 2014, presents an example architecture for live casino gaming. WO2014/067911A1 is incorporated herein in its entirety to give context to the embodiments described throughout this disclosure.

In the technical field of network based gaming and particularly network based live casino gaming, low latency is typically desired. Low latency may, for example, be desired in order to:

enable good user experience;
enable shorter game rounds, which, in turn, may result in better revenue generation for the live casino operators; and/or
fulfill jurisdiction regulations (e.g., games must be live according to some jurisdiction regulations).

SUMMARY

It is in view of the above considerations and others that the various embodiments of the present invention have been made.

It is a general object of the embodiments of the present invention to allow for improved live streaming of media for low-latency applications. In low-latency applications, there is a general desire, or need, to improve upon processing efficiency and/or overall latency between the devices. This may be especially true for network based live casino gaming applications allowing multiple user game devices associated with multiple players, multiple operators, multiple games, and/or multiple jurisdictions. More particularly, in live casino gaming applications it may be particularly desired to allow for a dynamic and/or adaptive live streaming of media.

The above-mentioned general object to allow for improved live streaming of media has therefore been addressed by the appended independent claims. Advantageous embodiments are defined in the appended dependent claims.

According to a first aspect, a method of live streaming of media for low-latency applications is provided. The low-latency application may be an application having latency in the range of 0-5 seconds, particularly in the range of 0-3 seconds and preferably in the range of 0-2 seconds.

The method comprises initiating broadcast, i.e. transmission, of a media stream over a Web Real-Time Communications (WebRTC) data channel. The method may additionally comprise broadcasting the media stream over the WebRTC data channel to one or more receivers, i.e. one or more devices capable of receiving the media stream over the WebRTC data channel.

The media stream may comprise an audio stream, a video stream or both an audio stream and a video stream.

In some embodiments, the media stream comprises one or several media packets. Each media packet may comprise a header and a media frame. For example, the header may comprise metadata and a time code.

In some embodiments, the method may additionally comprise, prior to initiating the broadcast of the media stream over the WebRTC data channel: i) monitoring a buffer state of a buffer; and, also, in dependence of the monitored buffer state ii) determining whether the broadcast of the media stream over the WebRTC data channel is to be initiated.

Additionally, or alternatively, the method may comprise prior to initiating the broadcast of the media stream over the WebRTC data channel: i) obtaining information related to media format(s) supported by one or more receivers (i.e., the one or more devices capable of receiving the media stream over the WebRTC data channel); and, also, in dependence of the obtained information ii) determining whether the broadcast of the media stream over the WebRTC data channel is to be initiated.

According to a second aspect, a computer program is provided. The computer program comprises instructions which, when executed on at least one processor, cause the at least one processor to carry out the method according to the first aspect. A carrier comprising the computer program may also be provided. The carrier may, e.g., be one of an electronic signal, an optical signal, a radio signal, or a computer readable storage medium.

According to a third aspect, there is provided a use of the method according to the first aspect in a gaming application. The gaming application may e.g. be a live casino gaming application.

According to a fourth aspect, a corresponding method of live streaming of media for low-latency applications is provided. Again, the low-latency application may be an application having latency in the range of 0-5 seconds, particularly in the range of 0-3 seconds and preferably in the range of 0-2 seconds.

The method comprises initiating reception of a media stream over a WebRTC data channel. The method may additionally comprise receiving the media stream over the WebRTC data channel from a transmitter, i.e. a device capable of transmitting the media stream over the WebRTC data channel.

The media stream may, e.g., comprise an audio stream, a video stream or both an audio stream and a video stream The media stream may comprise one or several media packets. Each media packet may comprise a header and a media frame. Also, the header may comprise metadata and a time code.

In certain embodiments, the method may additionally comprise processing the header and the media frame of each received media packet separately.

In some embodiments, the method further comprises: monitoring a buffer level of a media buffer; and continuing said reception of the media stream over the WebRTC data channel only in response to a determination that the monitored buffer level is equal to or above a predefined buffer level.

In some embodiments, the method may additionally, or alternatively, comprise: monitoring a buffer level of a media buffer; and adjust (i.e., change) a quality of the received media stream in dependence of the monitored buffer level of the media buffer.

According to a fifth aspect, a computer program is provided. The computer program comprises instructions which, when executed on at least one processor, cause the at least one processor to carry out the method according to the fourth aspect. A carrier comprising the computer program may also be provided. The carrier may, e.g., be one of an electronic signal, an optical signal, a radio signal, or a computer readable storage medium.

According to a sixth aspect, there is provided a use of the method according to the fourth aspect in a gaming application. The gaming application may e.g. be a live casino gaming application.

According to a seventh aspect, a first device configured for live streaming of media for low-latency applications is provided.

The low-latency application may be an application having latency in the range of 0-5 seconds, particularly in the range of 0-3 seconds and preferably in the range of 0-2 seconds.

The first device comprises a processor and a memory. The memory stores computer program code which, when run in the processor, causes the first device to initiate broadcast, i.e. transmission, of a media stream over a WebRTC data channel.

The media stream may comprise an audio stream, a video stream or both an audio stream and a video stream.

The first device may also comprise a transmitter adapted to broadcast the media stream over the WebRTC data channel to one or more receivers (i.e. one or more devices capable of receiving the media stream over the WebRTC data channel).

As described earlier, the media stream may comprise one or several media packets. Each media packet may comprise a header and a media frame. The header may comprise metadata and a time code.

In certain embodiments, the memory stores computer program code, which, when run in the processor causes the first device to, prior to initiating the transmission of the media stream over the WebRTC data channel: i) monitor a buffer state of a buffer; and in dependence of the monitored buffer state, and ii) determine whether the transmission of the media stream over the WebRTC data channel is to be initiated.

Additionally, or alternatively, the memory may store computer program code, which, when run in the processor causes the first device to, prior to initiating the transmission of the media stream over the WebRTC data channel: i) obtain information related to media format(s) supported by one or more receivers (i.e., the one or more devices capable of receiving the media stream over the WebRTC data channel); and, also, in dependence of the obtained information ii) determine whether the broadcast of the media stream over the WebRTC data channel is to be initiated.

According to an eighth aspect, there is provided a use of the first device according to the seventh aspect in a gaming application. The gaming application may e.g. be a live casino gaming application.

According to a ninth aspect, a second device configured for live streaming of media for low-latency applications is provided.

The low-latency application may be an application having latency in the range of 0-5 seconds, particularly in the range of 0-3 seconds and preferably in the range of 0-2 seconds.

The second device comprises a processor and a memory. The memory stores computer program code which, when run in the processor, causes the first device to initiate reception of a media stream over a WebRTC data channel.

The second device may also comprise a receiver adapted to receive the media stream over the WebRTC data channel from a transmitter (i.e., a device capable of transmitting the media stream over the WebRTC data channel).

The media stream may comprise an audio stream, a video stream or both an audio stream and a video stream.

The media stream may comprise one or several media packets. Each media packet may comprise a header and a media frame. The header may comprise metadata and a time code.

In some embodiments, the second device further comprises a buffer monitoring module adapted to monitor a buffer level of a media buffer of the second device; wherein the memory also stores computer program code which, when run in the processor, causes the second device to continue reception of the media stream over the WebRTC data channel only in response to a determination that the monitored buffer level is equal to or above a predefined buffer level.

In some embodiments, the second device further comprises a buffer monitoring module adapted to monitor a buffer level of a media buffer of the second device; wherein the memory also stores computer program code which, when run in the processor, causes the second device to adjust (i.e., change) a quality of the received media stream in dependence of the monitored buffer level of said media buffer.

According to a tenth aspect, there is provided a use of the second device according to the ninth aspect. The gaming application may e.g. be a live casino gaming application.

The various embodiments of the invention provide for improved live streaming of media. The various embodiments may be particularly advantageous in low-latency applications, i.e. applications that require, or benefit from, low latency.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION OF EMBODIMENTS

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements throughout the description.

Figure 1:
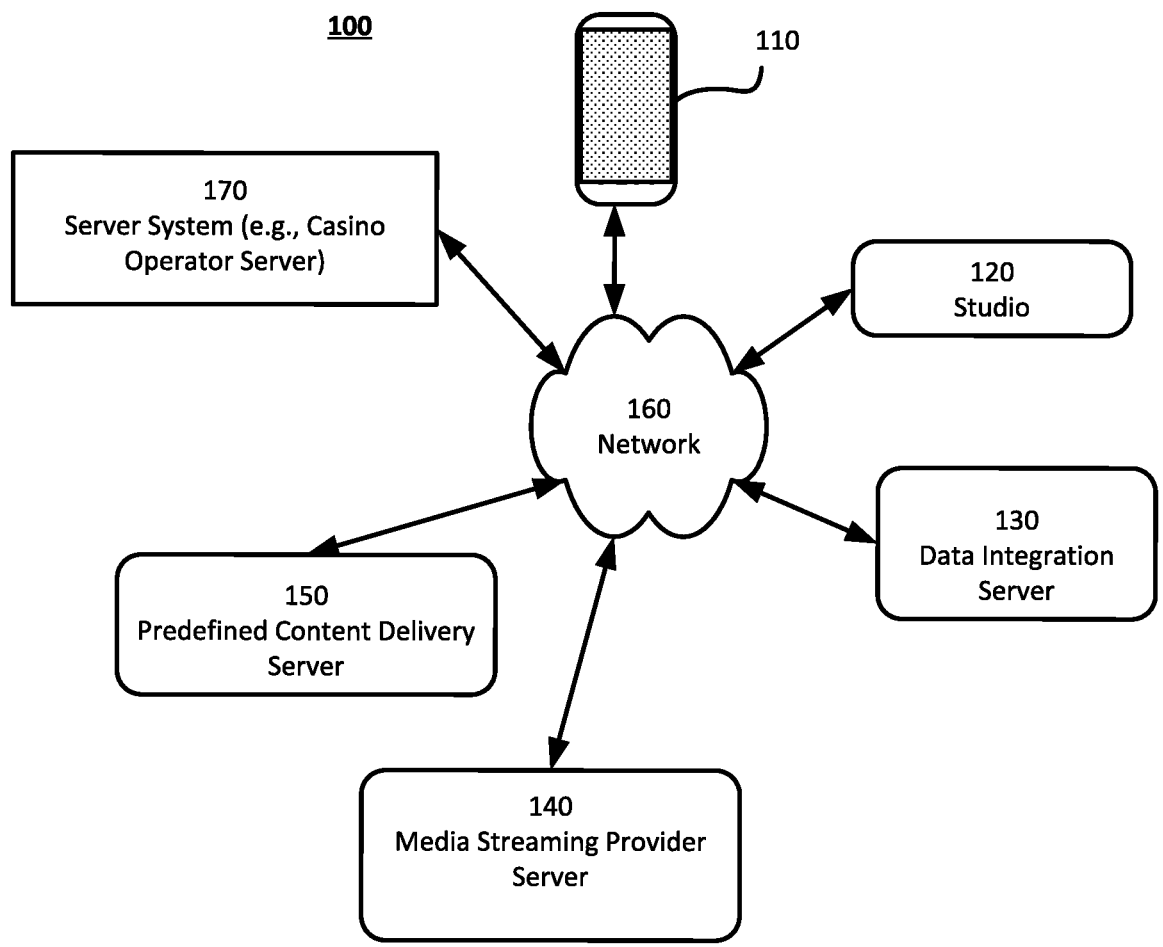
FIG. 1 shows an example gaming architecture configured to support live, real-time, multiplayer, multi-gaming device gaming, multiple casino operators and/or multiple jurisdictions.

With reference to FIG. 1, an example gaming architecture configured to support live, real-time, multiplayer, multi-gaming device gaming, multiple casino operators and/or multiple jurisdictions is schematically shown. This is an example environment where embodiments of the present invention could be advantageously applied. As will be appreciated, this example is provided merely as an example and should therefore not be construed as limiting the scope of the claims of this disclosure in any way.

FIG. 1 shows an example of a network architecture, or system 100, for enabling playing of network based live casino games. A game user, i.e. game player or game participant, may participate from a remote location, e.g. by means of a user game device 110, in a live casino game operated by a casino operator through a casino operator server 170.

In advantageous embodiments, the user game device 110 is a client device, such as a portable electronic device (e.g., a smart phone, a mobile telephone, a cellular telephone, a tablet computer, or a laptop computer).

In some embodiments, the system 100 comprises:
a studio 120 being configured for performing and recording live casino gaming;
a data integration server 130 being configured for integrating data pertaining to a casino game performed in the studio with game user specific data and casino operator specific data;
a media streaming provider server 140, e.g. configured:
for receiving live casino game media streams from the said studio 120, for generating casino operator specific media streams by mixing said live casino game media streams with casino operator specific content, and/or
for providing generated casino operator specific media streams to a user game device 110 of the game user; and
a predefined content delivery server 150 configured for delivering predefined content to the user game device 110.

In some embodiments, said user game device 110, said studio 120, said data integration server 130, said media streaming provider server 140, said related predefined content delivery server 150, and said casino operator server 170 are communicatively connectable to each other via a communications network 160, such as the Internet.

More detailed information of the example architecture, or system 100, may e.g. be found in WO2014/067911A1 and will, therefore, not be further detailed herein.

Figure 2:
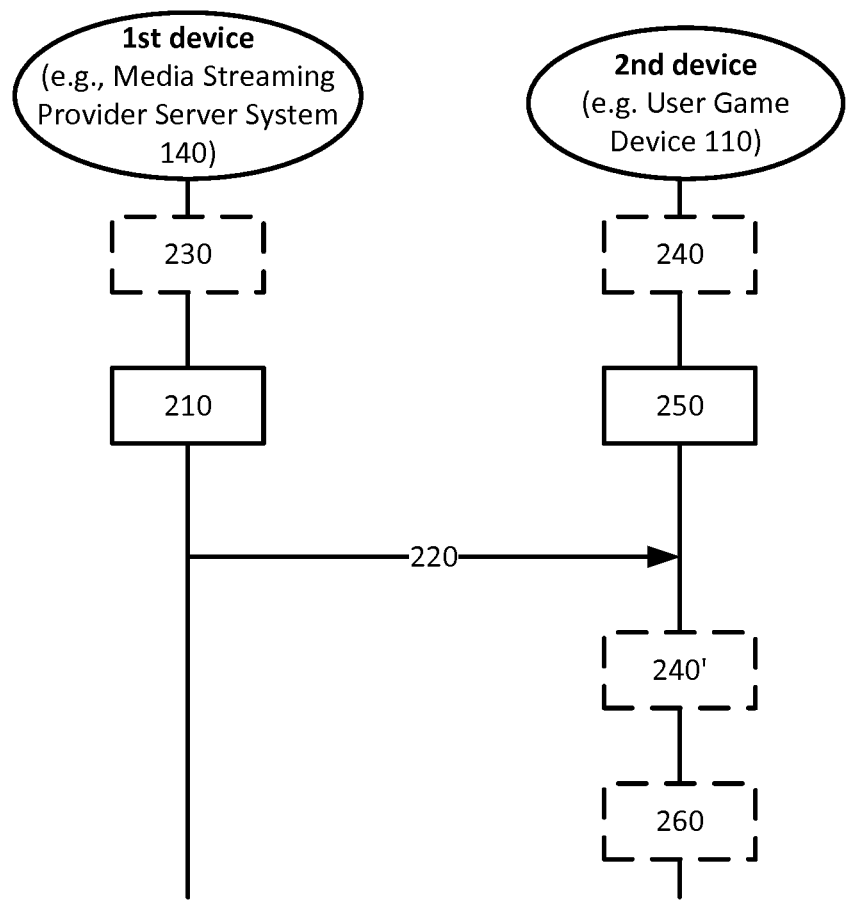
FIG. 2 schematically illustrates a signaling diagram showing example communications between a first device and a second device.

Reference is now made to FIG. 2, which is intended to illustrate a method according to an example embodiment of the present invention. FIG. 2 schematically shows a method of live streaming of media, which may be particularly useful in low-latency applications, such as gaming applications (e.g. a live casino gaming application as briefly described in conjunction with FIG. 1). The method may, consequently, be used in a low-latency application, e.g. in an application having a latency in the range of 0-5 seconds, particularly in the range of 0-3 seconds and preferably in the range of 0-2 seconds.

FIG. 2 is a signaling diagram between a first device and a second device. In some implementations, the first device may, e.g., be the media streaming provider server 140 shown in FIG. 1. In some implementations, the second device may, e.g., be a client device such as the user game device 110 shown in FIG. 1, preferably (but not necessarily) implemented as a portable electronic device.

As can be seen in FIG. 2, only a single media streaming provider server 140 and a single user game device 110 are schematically shown. However, it should be appreciated that the media streaming provider server 140 may support the simultaneous live streaming of media to multiple user game device s 110, e.g. by broadcasting. This is especially true in example architectures such as the example architecture in FIG. 1, i.e. architectures that support live, real-time, multi-player, multi-gaming device gaming, multiple casino operators and/or multiple jurisdictions.

In this embodiment, the first device 140 initiates 210 broadcast (i.e., a transmission) of a media stream over a WebRTC data channel. In response to this initiation 210, or triggering, the first device 140 also performs broadcast 220 of the media stream over the WebRTC data channel to one or more second devices 110. To this end, each one of the one or more second devices 110 may comprise a receiver for receiving the media stream over the WebRTC data channel.

In alternative embodiments, it is not necessary that the earlier-mentioned initiation 210, or triggering, is performed by the first device 140 itself. Instead, a different device (such as, e.g., the Casino Operator Server 170 shown in FIG. 1), which may be remotely located, may initiate 210 the broadcast of the media stream over the WebRTC data channel to said one or more second devices 110. For example, said different device may transmit, i.e. send, an initiation message (a.k.a. triggering message) to the first device 140 and, upon receipt by the first device 140, the first device 140 may begin broadcasting 220 the media stream over the WebRTC data channel to the one or more second devices 110.

As will be further detailed later herein, the media stream broadcasted over the WebRTC data channel may comprise one or several media packets. Each media packet may, e.g., comprise a header and a media frame. Furthermore, the header may comprise metadata and a time code. Furthermore, each media packet may additionally comprise a cue point field used to synchronize metadata to a media frame.

In some advantageous embodiments, the method may optionally comprise the selection 230 of a media streaming policy prior to initiating 210 the broadcast of the media stream over the WebRTC data channel. The selection 230 of media streaming policy may, for example, be made in dependence of a current network quality. To this end, a network buffer state may be used as an indicator of the current network quality. For example, the network buffer state may be a buffer fill level. A high buffer fill level may indicate congestion, whereas a lower buffer fill level may indicate the opposite (i.e., no or little congestion). Therefore, according to some embodiments, it may be advantageous to monitor a buffer state of a network buffer (e.g., at the media streaming provider server 140 or elsewhere in the network) and in dependence of the monitored network buffer state determine whether or not the broadcast of the media stream is to be made over the WebRTC data channel.

Additionally, or alternatively, the method may optionally comprise the selection 240 of a media streaming policy at the client side, i.e. at the second device 110 in this example. The selection 240 of media streaming policy may, for example, be made in dependence of hardware capabilities and/or software capabilities of the second device 110.

With continued reference to FIG. 2, the second device 110 may initiate 250 reception of a media stream over a WebRTC data channel. Thus, the second device 110 may also receive 220 the media stream over the WebRTC data channel from the first device 140.

In some embodiments, it is not necessary that this initiation 250, or triggering, is performed by the second device 140 itself. Instead, a different device (e.g., the Casino Operator Server 170 shown in FIG. 1), which may be remotely located, may initiate 250 the reception of the media stream over the WebRTC data channel from the first device 140. For example, upon the second device 110 entering or activating a game session of a live casino game, said different device may transmit, i.e. send, an initiation message (a.k.a. triggering message) to the second device 110 and, upon receipt by the second device 110, the second device 110 may begin receiving 220 the media stream over the WebRTC data channel.

It should also be appreciated that the method may advantageously also comprise a selection 240' of a media streaming policy at the client side 11 after the transmission of the media stream over a WebRTC data channel. The method performed by the second device 110 may for example comprise monitoring the buffer level of the media buffer of the second device; and continue reception of the media stream over a WebRTC data channel, e.g., as long as the determination yields that the buffer level is equal to or above the predefined buffer level. Else, i.e. in response to a determination that the buffer level is below said predefined buffer level, the method may include adjusting the reception quality of the media stream that is received by the second device 110. In other words, a selection of media streaming policy may be made in dependence of a current buffer level of the media buffer. As will be appreciated, it is consequently made possible to adaptively adjust the quality of the media stream that is received by the second device 110 in dependence of a determined media buffer level of the media buffer of the second device 110. The exact level of the above-mentioned predefined buffer level of the media buffer should be tested and evaluated for each specific application and may, for example, be dependent on user demands, computer architecture requirements and/or other requirements. Monitoring a buffer level of the media buffer and adaptively adjusting (i.e., changing) the quality of a received media stream at the client side (i.e., the second device 110) has many advantages. For example, this allows for an improved live streaming solution where the different receiving devices (i.e, the second devices 110 in this example) can dynamically adapt to its respective current buffer status. In turn, this leads to a live streaming solution which is good at adapting to current hardware and/or software capabilities of the different second device(s) 110 for receiving live-streamed media.

As can be seen in FIG. 2, the method may also comprise processing 260 the received media stream. Typically, the processing 260 of the received media stream may include processing the headers and the media frames of each one of the received media packets separately.

Figure 3:
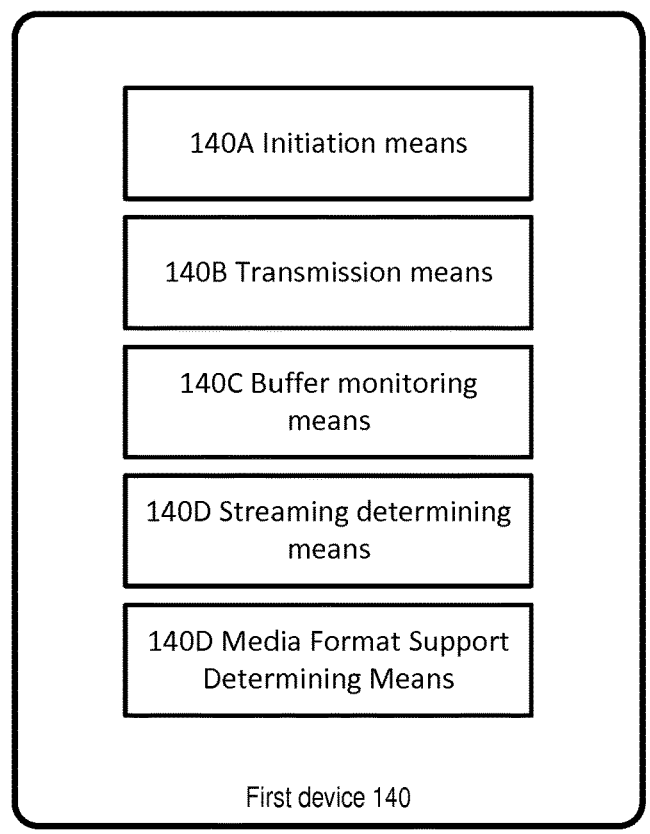
FIG. 3 schematically illustrates an embodiment of the first device in FIG. 2.

Turning now to FIG. 3, an example embodiment of a first device 140 shown in FIG. 2 is schematically illustrated. The first device 140 is accordingly configured for live streaming of media, e.g. in low-latency applications. The first device 140 may comprise means 140A adapted to initiate broadcast (i.e., a transmission) of a media stream over a WebRTC data channel. Additionally, or alternatively, the first device 140 may comprise means 140B adapted to broadcast the media stream over the WebRTC data channel to one or more receivers, i.e. one or more devices (e.g., second device(s) 110) capable of receiving the media stream over the WebRTC data channel. The first device 110 may optionally also include means 140C adapted to monitor a buffer state of a network buffer. The network buffer may be integral with the first device 140 or, alternatively, a buffer that is external to the first device 140. Still further, the first device 110 may optionally also include means 140D adapted to determine, in dependence of the monitored buffer state, whether the transmission of the media stream over the WebRTC data channel is to be initiated. In some embodiments, the first device 140 may additionally and optionally comprise means 140E adapted to obtain information related to the media format(s) supported by one or more receivers. For example, said means 140E may adapted to receive the information related to the media format(s) from those devices that are in communication with the first device 110. Furthermore, the earlier-mentioned means 140D may be further adapted to determine, in dependence of the obtained information, whether the transmission of the media stream over the WebRTC data channel is to be initiated.

Figure 4:
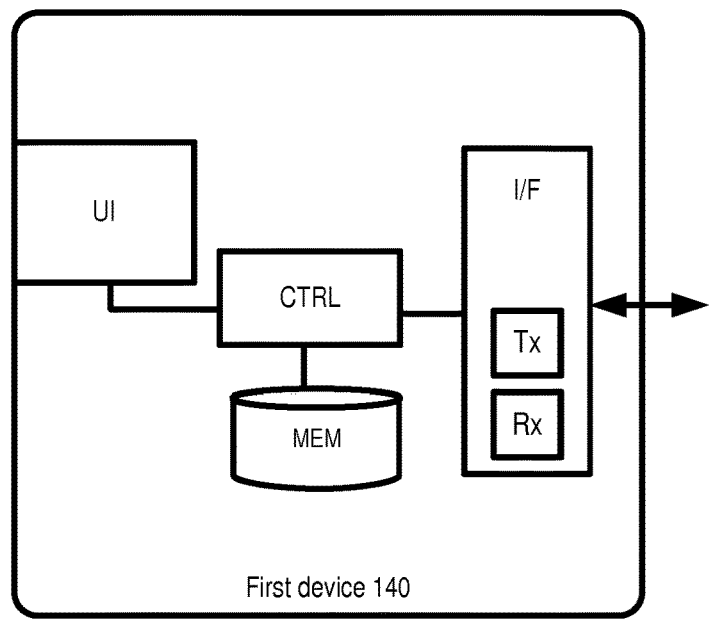
FIG. 4 schematically illustrates an example implementation of the first device.

With reference to FIG. 4, an example implementation of the first device 140 shown in FIGS. 2 and 3 is schematically illustrated. The first device 140 is configured for live streaming of media, e.g. in low-latency applications. The first device 140 includes a processing device, or processor CTRL. Also, the first device 140 comprises a memory MEM. In some embodiments, the memory MEM stores computer program code which, when run in the processor CTRL, causes the first device 140 to initiate broadcast of a media stream over a WebRTC data channel. Optionally, and advantageously, the first device 140 also includes a transmitter Tx adapted a transmitter adapted to broadcast (i.e., transmit) the media stream over the WebRTC data channel to one or more receivers.

In the embodiment illustrated in FIG. 4, the transmitter Tx is part of a communications interface I/F. The communications interface I/F may be provided in order to allow the first device to communicate with other devices, e.g. via a network. To this end, the communications interface I/F may comprise the transmitter Tx and a receiver Rx. Alternatively, the communications interface may comprise a transceiver Tx/Rx combining both transmission and reception capabilities. The communications interface I/F may include a radio frequency (RF) interface allowing the first device 140 to communicate with other devices through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. Additionally, the first device 140 may optionally comprise a user interface UI, which may for example be comprised of a display and a keypad. Advantageously, the user interface UI includes a touch-sensitive display. As such, the touch-sensitive display may be a touch screen display upon which virtual keys may be displayed and operated.

In some embodiments, the memory MEM advantageously also stores computer program code, which, when run in the processor CTRL causes the first device 140 to, prior to initiating the broadcast of the media stream over the WebRTC data channel: monitor a buffer state of a buffer; and determine, in dependence of the monitored buffer state, whether the broadcast of the media stream over the WebRTC data channel is to be initiated.

Additionally, or alternatively, the memory MEM may store computer program code, which, when run in the processor CTRL causes the first device 140 to, prior to initiating the broadcast of the media stream over the WebRTC data channel: obtain information related to the media format(s) supported by one or more receivers; and determine, in dependence of the obtained information, whether the broadcast of the media stream over the WebRTC data channel is to be initiated.

Figure 5:
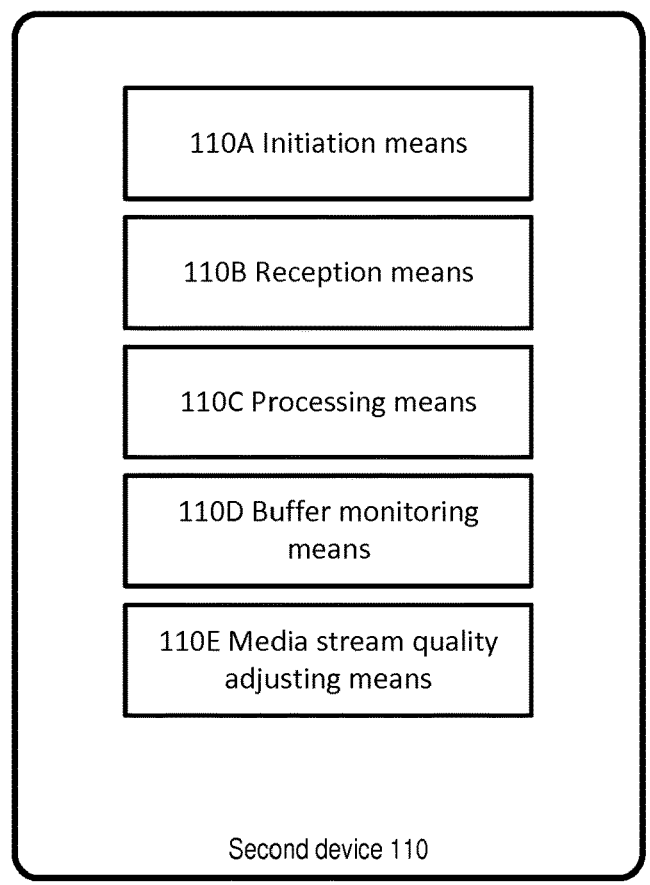
FIG. 5 schematically illustrates an embodiment of the second device in FIG. 2.

Turning now to FIG. 5, an example embodiment of a second device 110 shown in FIG. 2 is schematically illustrated. The second device 110 is accordingly configured for live streaming of media, e.g. in low-latency applications. The second device optionally includes means 110A adapted to initiate reception of a media stream over a WebRTC data channel. Additionally, or alternatively, the second device 110 comprises means 110B adapted to receive the media stream over the WebRTC data channel from a transmitter, i.e. a device capable of transmission of the media stream over a WebRTC data channel (e.g., a first device 140). Additionally, the second device 110 may comprise means 110C adapted to process the header and the media frame of each received media packet separately. Still further, the second device 110 may optionally comprise means 110D adapted to monitor a buffer level of a media buffer (not shown). Also, the means 110A may be further adapted to continue said reception of the media stream over the WebRTC data channel, e.g. only in response to a determination by the means 110D that the monitored buffer level is equal to or above a predefined buffer level. In some embodiments, means 110E are also provided to adaptively adjust (i.e., change) the quality of a received media stream in dependence of the monitored buffer level of said media buffer.

Figure 6:
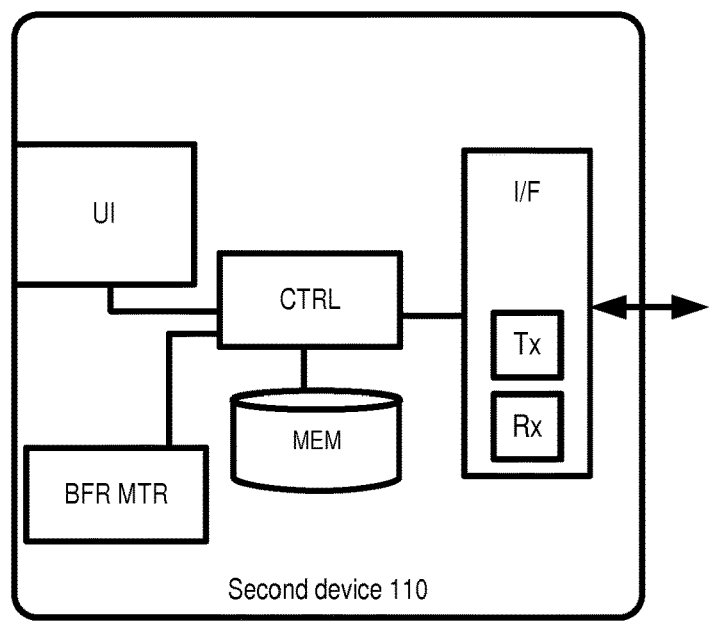
FIG. 6 schematically illustrates an example implementation of the second device.

With reference to FIG. 6, an example implementation of the second device 110 shown in FIGS. 2 and 5 is schematically illustrated. The second device 110 is accordingly configured for live streaming of media, e.g. in low-latency applications. The second device 110 includes a processing device, or processor CTRL. Also, the second device 110 comprises a memory MEM. In some embodiments, the memory MEM stores computer program code which, when run in the processor CTRL, causes the second device 110 to initiate reception of a media stream over a WebRTC data channel. Optionally, and advantageously, the second device 110 also comprises a receiver Rx adapted to receive the media stream over the WebRTC data channel from a transmitter, i.e. a device capable of transmission of the media stream over a WebRTC data channel (e.g., a first device 140).

In the embodiment illustrated in FIG. 6, the transmitter Rx is part of a communications interface I/F. The communications interface I/F may be provided in order to allow the second device 110 to communicate with other devices, e.g. via a network. To this end, the communications interface I/F may comprise a transmitter Tx and the receiver Rx. Alternatively, the communications interface may comprise a transceiver Tx/Rx combining both transmission and reception capabilities. The communications interface I/F may include a radio frequency (RF) interface allowing the second device 110 to communicate with other devices through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. Additionally, the first device 140 may optionally comprise a user interface UI, which may for example be comprised of a display and a keypad. Advantageously, the user interface UI includes a touch-sensitive display. As such, the touch-sensitive display may be a touch screen display upon which virtual keys may be displayed and operated.

In advantageous embodiments, the processing device or processor CTRL is adapted to process the header and the media frame of each received media packet separately.

In some embodiments, the second device 110 optionally and advantageously also comprises a buffer monitoring module BFR MTR adapted to monitor a buffer level of a media buffer (not shown) of the second device 110. For example, the memory MEM may store computer program code which, when run in the processor, causes the second device 110 to initiate reception (via the receiver Rx) of a media stream over the WebRTC data channel only in response to a determination that the monitored buffer level is equal to or above a predefined buffer level. In some embodiments, the memory MEM may additionally, or alternatively, store computer program code which, when run in the processor, causes the second device 110 to adaptively adjust (i.e., change) the quality of a received media stream in dependence of the monitored buffer level of said media buffer.

Figure 7:
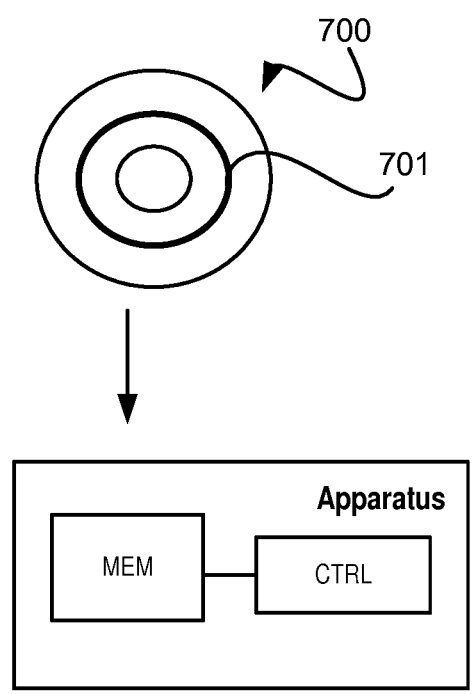
FIG. 7 schematically illustrates an example embodiment of a computer-readable medium.

Turning now to FIG. 7, another embodiment will be briefly discussed. FIG. 7 shows an example of a computer-readable medium, in this example in the form of a data disc 700. In one embodiment the data disc 700 is a magnetic data storage disc. The data disc 700 is configured to carry instructions 701 that can be loaded into a memory MEM of an apparatus, or electronic device, such as the first device 140 or the second device 110. Upon execution of said instructions by a processing device or processor CTRL of the apparatus, the apparatus is caused to execute a method or procedure according to any one the embodiments disclosed in this disclosure. The data disc 700 is arranged to be connected to or within and read by a reading device (not shown), for loading the instructions into the processor. One such example of a reading device in combination with one (or several) data disc(s) 700 is a hard drive. It should be noted that the computer-readable medium can also be other mediums such as compact discs, digital video discs, flash memories or other memory technologies commonly used. In such an embodiment the data disc 700 is one type of a tangible computer-readable medium. The instructions may alternatively be downloaded to a computer data reading device, such as a computer or other electronic device capable of reading computer coded data on a computer-readable medium, by comprising the instructions in a computer-readable signal (not shown) which is transmitted via a wireless (or wired) interface (for example via the Internet) to the computer data reading device for loading the instructions into a processor CTRL of the electronic device. In such an embodiment, the computer-readable signal is one type of a non-tangible computer-readable medium.

Various Detailed Implementations of the Live Streaming for Low-Latency Applications In the following, certain detailed example implementations of the embodiments described herein will be described in some more detail.
First Device (e.g., Media Streaming Provider Server System)

The first device discussed, e.g., in connection with FIG. 2 may, for example, be implemented by a Media Streaming Provider Server System 140 as shown in FIG. 1.

In some implementations, the Media Streaming Provider Server System 140 may be implemented as a single device, such as a single server.

Figure 8:
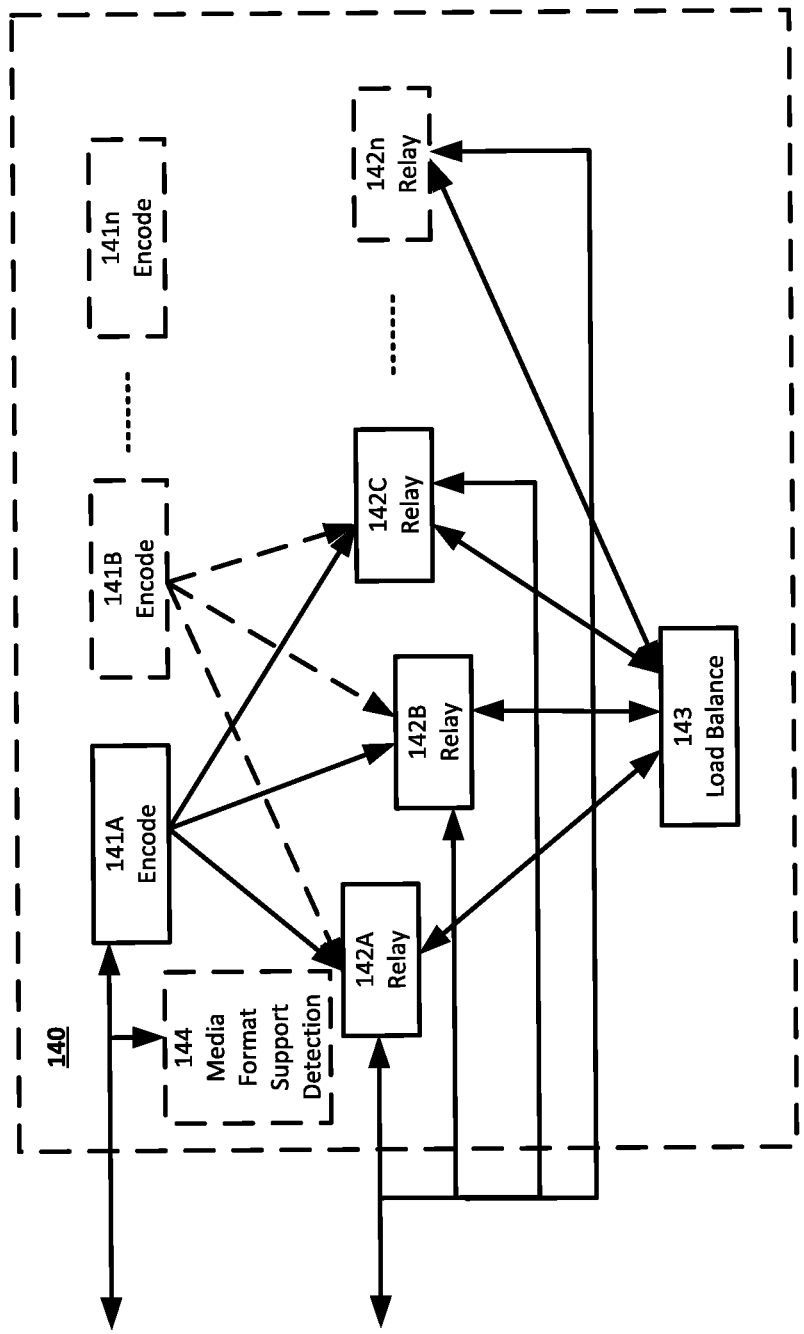
FIG. 8 schematically illustrates an example implementation of a first device, here exemplified by a Media Streaming Provider Server System, in accordance with an embodiment.

Nevertheless, in advantageous embodiments, the Media Streaming Provider Server System 140 may instead be implemented in a distributed manner by more than one device making up the Media Streaming Provider Server System 140. For example, FIG. 8 illustrates an example implementation of a distributed Media Streaming Provider Server System 140. As can be seen in FIG. 8, the Media Streaming Provider Server System 140 may comprise one or several encoders 141a-n, or encoder servers. Furthermore, one or more relay servers 142a-n may be provided. Finally, one or more load balancers 143, or load balancing devices, may be provided. The Media Streaming Provider Server System 140 may optionally also comprise a device 144 that is adapted to detect the media format(s) that is/are supported by the client device(s) (e.g., user game device(s) 110) that is/are communicatively connected to the Media Streaming Provider Server System 140. For example, said device 144 may be adapted to detect the media format(s) supported by the browser(s) of said client device(s) that is/are communicatively connected to the Media Streaming Provider Server System 140.

An encoder 141a-n, sometimes also referred to as a media encoder, may be capable of encoding an incoming media signal into different media formats. For example, this may be advantageous in order to support many different browsers at the client devices (e.g., the user game devices 110).

The output from the one or more encoders 141a-n may be transmitted to one or several relay server 142a-n. The various relay servers 142a-n may support multiple media streams, e.g. comprising different media content, different media formats and/or different media quality. This may be advantageous in order to be able to support many users.

In some implementations, the relay servers 142a-n may accept media streams from encoders 141a-n in dependence of, or based on, certain requests from the client device(s) that is/are communicatively connected to the Media Streaming Provider Server System 140. This way it may be possible for the relay servers(s) 142a-n to focus its internal hardware resources, etc., based on the certain requests from the client device(s). This may decrease the internal load of the relay server(s) 142a-n, as the relay server(s) 142a-n does/do not necessarily have to process all incoming media streams.

The provision of several encoders 141a-n that are capable of encoding an incoming media signal into different media formats together with the several relay servers 142a-n may allow for supporting many client devices, e.g. user game devices 110. The provision of several encoders 141a-n that are capable of encoding an incoming media signal into different media formats together with the several relay servers 142a-n may also allow for dynamic Media Streaming Provider Server System 140 which is adapted to adaptively adopt to different media formats depending on e.g. requirements of the client devices (e.g., the user game devices 110) that are communicatively connected to the Media Streaming Provider Server System 140. This may, e.g., be important or desired in gaming applications such as live casino applications.

Furthermore, the one or more relay servers may be communicatively connected to one or more load balancers 143. This allows for the Media Streaming Provider Server System 140 to select a proper relay server depending on e.g. a detected load and/or a detected geographical position. For example, each one of the relay servers 142a-n may provide, e.g. transmit, messages including load information such as load statistics to the load balancer 143. The load balancer 143 may be adapted to collect load information such as load statistics from all communicatively connected relay servers 142a-n. Based on the collected load information, the load balancer 143 may determine the relative load distribution among the communicatively connected relay servers 142*a-n*. Furthermore, the load balancer 143 may be adapted to control the load distribution among the communicatively connected relay servers 142*a-n*, e.g. by sending instructions to the encoders 141*a-n* and/or the relay servers 142*a-n*. This way it is made possible to allow for an increased evenness in the load distribution among the communicatively connected relay servers 142*a-n*.

An advantage with a Media Streaming Provider Server System 140 provided in a distributed manner, such as the example implementation in FIG. 8, is that scalability may be enhanced. Also, it may be possible to improve the signaling. For example, it may be possible to reduce unnecessary signaling and, as a consequence, congestion may be reduced throughout the network. This in turn may result in latency improvements.

Media Formats

The encoder(s) 141*a-n* of the first device (e.g., the Media Streaming Provider Server System 140) may be configured to support several media formats including, but not limited to:

H.264
H.265
VP8
VP9
VP10
MPEG-1
JPEG
AAC
ALAW

The second device, e.g. user game device 110, may be configured to support at least one of the above-mentioned media formats as corresponding incoming media formats.

Media Packet Processing

The encoder(s) 141*a-n* may be configured to support any incoming media format, such as any one of the above-mentioned media formats (i.e., H.264, H.265, VP8, VP9, VP10, MPEG-1, JPEG, AAC, and ALAW).

A media stream may comprise one or several media packets. Furthermore, each media packet may comprise a header and a media frame. In some embodiments, metadata may be input, e.g. injected, to the media stream. For example, meta data may be input, e.g. injected, such that the meta data is aligned to said media frame. Furthermore, each media packet may additionally comprise a cue point field used to synchronize metadata to a media frame.

Second Device (e.g., User Game Device)

Figure 9:
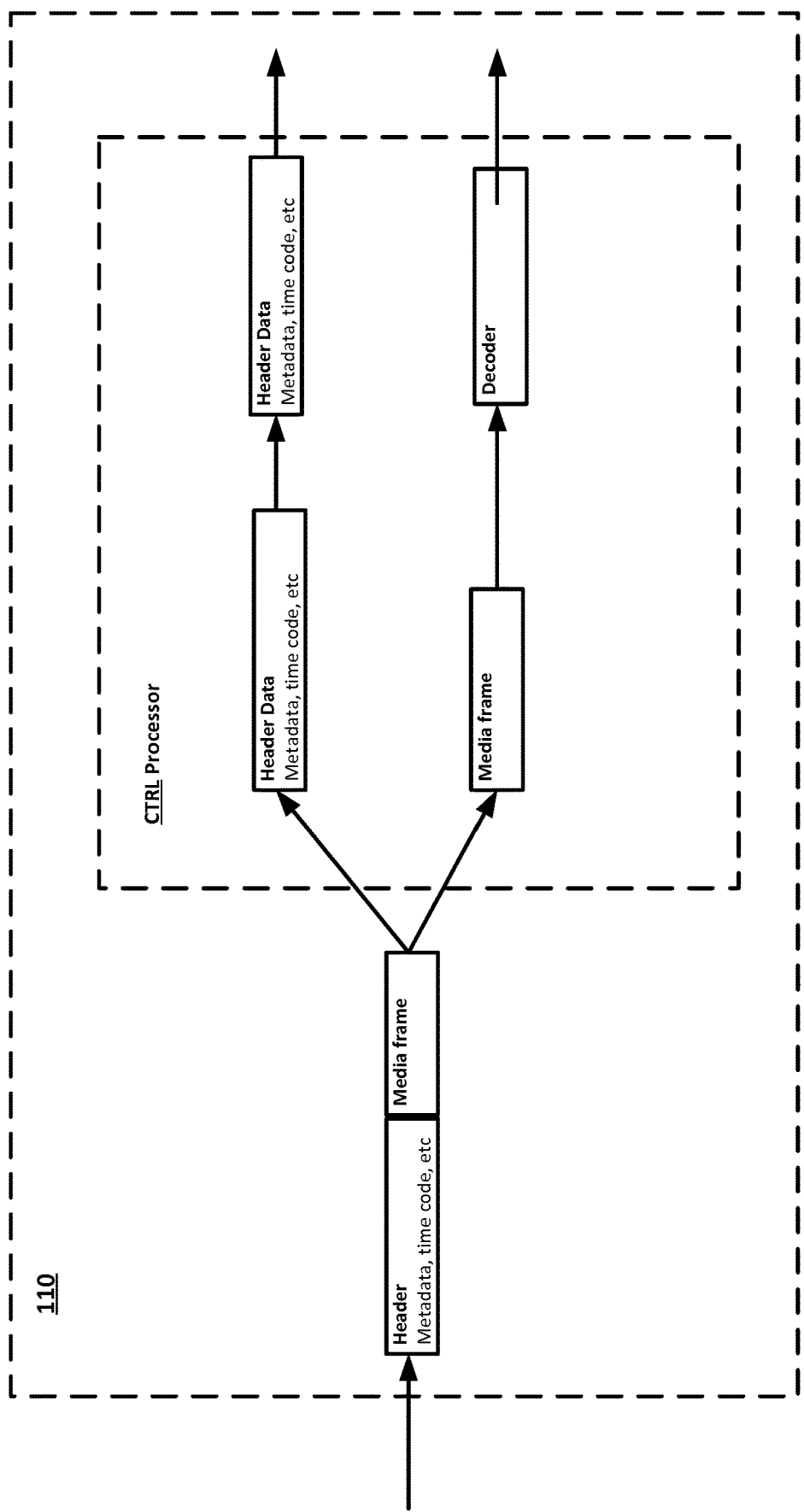
FIG. 9 schematically illustrates an example implementation of the processing, or handling, of incoming media packets at a second device, in accordance with an embodiment.

Reference is now made to FIG. 9, which schematically illustrates an example implementation of a second device 110 according to some embodiments. As can be seen in FIG. 9, the second device 110 may be configured to receive an incoming media stream. As mentioned earlier, the media stream may comprise one or several media packets. One example media packet is schematically illustrated in FIG. 9. As is illustrated, a media packet may comprise a header and a media frame. The header may include header data such as meta data and time code. In other words, a media packet may include meta data that is aligned with a media frame. Additionally, the header may include meta data identification and/or a time stamp. Furthermore, each media packet may additionally comprise a cue point field for synchronizing the metadata to a media frame.

As can be seen in FIG. 9, an incoming media packet may be divided, or split, into the header data and the media frame, respectively. The division of the media packet into header data and media frame allows for subsequent separate processing of the header data and the media frame, respectively.

The second device 110 may also comprise a media stream processing device or processor CTRL. In some implementations, the media stream processing device CTRL may be implemented by means of a JavaScript Client Library. As can be seen in FIG. 9, the media stream processing device CTRL may be configured to process the header data (e.g., meta data) and the media frame separately.

As was described earlier, some embodiments of the present invention suggest communication of media streams over a WebRTC data channel. The present disclosure recognizes that the communication of media streams over a data channel, such as a WebRTC data channel, may have several advantages. With continued reference to FIG. 9, this enables the second device 110 to separate the header and media frame, respectively, prior to the incoming media stream enters the media stream processing device CTRL, here exemplified by a JavaScript Client Library. Upon entry into the media stream processing device CTRL, the header can be divided, or split, from the media frame and the media stream processing device CTRL may be configured to process the header and the media frame separately. The meta data of a media packet can be matched to a respective media frame based on the time code. Accordingly, the header and the media frame can be synchronized in time in the media stream.

FIG. 9 schematically illustrates that the division, or split, between the header and the media frame of a media packet is performed prior to the media processing device CTRL receives the header and the media frame, respectively. However, it should be appreciated that the division, or split, between the header and the media frame of a media packet may alternatively be performed by means of the media processing device CTRL.

Media Streaming Policy Based on Network Buffer State

As described earlier in conjunction with FIG. 2, a media streaming policy may, in some embodiments, be selected prior to initiating a transmission of the media stream over the WebRTC data channel. In one embodiment, the selection 230 of media streaming policy may, for example, be made in dependence of a current network quality. To this end, a network buffer state may be used as an indicator of the current network quality. For example, the network buffer state may be a buffer fill level. A high buffer fill level may indicate congestion, whereas a lower buffer fill level may indicate the opposite (i.e., no or little congestion). Therefore, according to some embodiments, it may be advantageous to monitor 231 a buffer state of a network buffer (e.g., at the media streaming provider server 140) and in dependence of the monitored network buffer state determine whether or not the transmission of the media stream is to be made over the WebRTC data channel.

Media Streaming Policy Based on Media Buffer State

According to one embodiment, a method is performed by the second device 110 (e.g., a user game device). For instance, the second device 110 may be adapted to monitor a buffer level of a media buffer of the second device. For example, in accordance with some embodiments the quality of a received media stream may be adjusted in dependence of the monitored buffer level of a media buffer of the second device.

Media Streaming Policy Based on Media Formats Supported by the Second Device Option I Additionally, or alternatively, the selection of media streaming policy may be made in dependence of the media formats that is/are supported by the second device 110. In one embodiment, a "fall back" procedure is used. Or said differently, the second device may check which media format(s) that is/are supported and select the media format having the highest priority from look-up table database or the like. An example table of possible priorities is shown hereinbelow:

TABLE 1

Example of "fall back" procedure for a second device supporting H.264, AAC, MPEG-1, ALAW and JPEG.

| Priority | Media Format | Streaming Policy |
|---|---|---|
| 1 (Highest) | H.264 and AAC | WebRTC Datachannel |
| 2 | H.264 and AAC | WebSockets |
| 3 | MPEG-1 and ALAW | Compressed Audio over WebRTC Datachannel |
| 4 | MPEG-1 and ALAW | Compressed Audio over WebSocket |
| 5 | JPEG and ALAW | Compressed Audio over WebRTC Datachannel |
| 6 (Lowest) | JPEG and ALAW | Compressed Audio over WebSocket |

Media Streaming Policy Based on Media Formats Supported by the Second Device Option II Additionally, or alternatively, the selection of media streaming policy may be made in dependence of the media formats that is/are supported by the second device 110 as determined by the first device 110. The method may be performed by the first device 140 (see FIG. 2). First, one or more media formats supported by the second device 110 that is communicatively connected with the first device 140 is detected, or otherwise determined. In other words, the first device 140 may be configured to obtain information related to which media format(s) that is/are supported by the second device 110. For example, in some implementations, the first device 140 may transmit a request message, or order message, to the second device 110 requesting the second device 110 to return a message including information related to which media format(s) that is/are supported by this second device 110. Upon receipt of this request message, the second device 110 may create a message including information related to any media format(s) that is/are supported by this second device 110. The created message may then be returned, i.e. transmitted, to the first (i.e., requesting) device 140. Upon receipt of this message, the first device 140 may retrieve the information related to said media format(s) from the received message. Furthermore, the first device 140 may be configured to determine that the broadcast of the media stream over the WebRTC data channel is to be initiated in dependence of which media format(s) that is/are supported by the second device. A similar look-up table as Table 1 may be utilized to determine the media streaming policy for a certain second device 110.

The above-mentioned different methods for selecting media streaming policy may advantageously combined. Accordingly, the selection of media streaming policy may be made on a combination of i) media format(s) supported by the second devices 110, ii) current buffer state of the media buffer of the respective second devices 110, and/or iii) current network buffer state. This may allow for an improved live streaming of media, because the live streaming of media is capable of dynamically adapt to various media format support of the communicatively connected second devices 110 and/or to changes in the current streaming conditions (e.g., media buffer states and/or network buffer states).

LIST OF NUMBERED EXAMPLE EMBODIMENTS

The technology described in this disclosure thus encompasses without limitation the following Numbered Example Embodiments (NEE's):

NEE1. A method of live streaming of media for low-latency applications, the method comprising:
 initiating (210) broadcast of a media stream over a Web Real-Time Communications, WebRTC, data channel.

NEE2. The method according to embodiment NEE1, further comprising:
 broadcasting (220) the media stream over the WebRTC data channel to one or more receivers.

NEE3. The method according to embodiment NEE1 or NEE2, wherein the media stream comprises one or several media packets, and wherein each media packet comprises a header and a media frame.

NEE4. The method according to embodiment 3, wherein the header comprises metadata and a time code.

NEE5. The method according to any one of the embodiments NEE1-NEE4, further comprising, prior to initiating the broadcast of the media stream over the WebRTC data channel:
 monitoring (230) a buffer state of a buffer; and in dependence of the monitored buffer state
 determining (230) whether the broadcast of the media stream over the WebRTC data channel is to be initiated.

NEE6. The method according to any one of the embodiments NEE1-NEE5, further comprising, prior to initiating the broadcast of the media stream over the WebRTC data channel:
 obtaining (230) information related to the media format(s) supported by one or more receivers; and in dependence of the obtained information
 determining (230) whether the broadcast of the media stream over the WebRTC data channel is to be initiated.

NEE7. The method according to any one of the embodiments NEE1-NEE6, wherein a low-latency application is an application having a latency in the range of 0-5 seconds, particularly in the range of 0-3 seconds and preferably in the range of 0-2 seconds.

NEE8. Computer program (701), comprising instructions which, when executed on at least one processor, cause the at least one processor to carry out the method according to any one of embodiments NEE1-NEE7.

NEE9. A carrier (700) comprising the computer program (701) of the embodiment NEE8, wherein the carrier is one of an electronic signal, an optical signal, a radio signal, or a computer readable storage medium.

NEE10. A use of the method according to any one of embodiments NEE1-NEE7 in a gaming application.

NEE11. The use of the method according to embodiment NEE10, wherein the gaming application is a live casino gaming application.

NEE12. A method of live streaming of media for low-latency applications, the method comprising:
 initiating (250) reception of a media stream over a Web Real-Time Communications, WebRTC, data channel.

NEE13. The method according to embodiment NEE12, further comprising:
 receiving (220) the media stream over the WebRTC data channel from a transmitter.

NEE14. The method according to embodiment NEE12 or NEE13, wherein the media stream comprises one or several media packets, and wherein each media packet comprises a header and a media frame.

NEE15. The method according to embodiment NEE14, wherein the header comprises metadata and a time code.

NEE16. The method according to any one of the embodiments NEE12-NEE15, further comprising:
  processing (260) the header and the media frame of each received media packet separately.

NEE17. The method according to any one of the embodiments NEE12-NEE16, further comprising:
  monitoring (240) a buffer level of a media buffer; and
  continuing (250) said reception of the media stream over the WebRTC data channel only in response to a determination that the monitored buffer level is equal to or above a predefined buffer level.

NEE18. The method according to any one of the embodiments NEE12-NEE17, further comprising:
  monitoring (240) a buffer level of a media buffer; and
  adjusting (260) a quality of the received media stream in dependence of the monitored buffer level of the media buffer.

NEE19. The method according to any one of the embodiments NEE12-NEE18, wherein a low-latency application is an application having a latency in the range of 0-5 seconds, particularly in the range of 0-3 seconds and preferably in the range of 0-2 seconds.

NEE20. Computer program (701), comprising instructions which, when executed on at least one processor, cause the at least one processor to carry out the method according to any one of embodiments NEE12-NEE19.

NEE21. A carrier (700) comprising the computer program (701) of the embodiment NEE20, wherein the carrier is one of an electronic signal, an optical signal, a radio signal, or a computer readable storage medium.

NEE22. A use of the method according to any one of embodiments NEE12-NEE19 in a gaming application.

NEE23. The use of the method according to embodiment NEE22, wherein the gaming application is a live casino gaming application.

NEE24. A first device (140) configured for live streaming of media for low-latency applications, the first device (140) comprising:
  a processor (CTRL); and
  a memory (MEM) storing computer program code which, when run in the processor (CTRL), causes the first device (140) to initiate broadcast of a media stream over a Web Real-Time Communications, WebRTC, data channel.

NEE25. The first device (140) according to embodiment NEE24, further comprising:
  a transmitter (Tx) adapted to broadcast the media stream over the WebRTC data channel to one or more receivers.

NEE26. The first device (140) according to embodiment NEE24 or NEE25, wherein the media stream comprises one or several media packets, and wherein each media packet comprises a header and a media frame.

NEE27. The first device (140) according to embodiment NEE26, wherein the header comprises metadata and a time code.

NEE28. The first device (140) according to any one of the embodiments NEE24-NEE27, wherein the memory (MEM) stores computer program code, which, when run in the processor (CTRL) causes the first device (140) to, prior to initiating the broadcast of the media stream over the WebRTC data channel:
  monitor a buffer state of a buffer; and in dependence of the monitored buffer state
  determine whether the broadcast of the media stream over the WebRTC data channel is to be initiated.

NEE29. The first device (140) according to any one of the embodiments NEE24-NEE28, wherein the memory (MEM) stores computer program code, which, when run in the processor (CTRL) causes the first device (140) to, prior to initiating the broadcast of the media stream over the WebRTC data channel:
  obtain information related to the media format(s) supported by one or more receivers; and in dependence of the obtained information
  determine whether the broadcast of the media stream over the WebRTC data channel is to be initiated.

NEE30. The first device (140) according to any one of the embodiments NEE24-NEE29, wherein a low-latency application is an application having a latency in the range of 0-5 seconds, particularly in the range of 0-3 seconds and preferably in the range of 0-2 seconds.

NEE31. A use of the first device (140) according to any one of embodiments NEE24-NEE30 in a gaming application.

NEE32. The use of the first device (140) according to embodiment NEE31, wherein the gaming application is a live casino gaming application.

NEE33. A second device (110) configured for live streaming of media for low-latency applications, the second device (110) comprising:
  a processor (CTRL); and
  a memory (MEM) storing computer program code which, when run in the processor (CTRL), causes the second device (110) to initiate reception of a media stream over a Web Real-Time Communications, WebRTC, data channel.

NEE34. The second device (110) according to embodiment NEE33, further comprising:
  a receiver (Rx) adapted to receive the media stream over the WebRTC data channel from a transmitter.

NEE35. The second device (110) according to embodiment NEE33 or NEE34, wherein the media stream comprises one or several media packets, and wherein each media packet comprises a header and a media frame.

NEE36. The second device (110) according to embodiment NEE35, wherein the header comprises metadata and a time code.

NEE37. The second device (110) according to any one of the embodiments NEE33-NEE36, further comprising:
  a processor (CTRL) adapted to process the header and the media frame of each received media packet separately.

NEE38. The second device (110) according to any one of the embodiments NEE33-NEE37, further comprising:
  a buffer monitoring module (BFR MTR) adapted to monitor a buffer level of a media buffer of the second device; and wherein the memory (MEM) stores computer program code which, when run in the processor (CTRL), causes the second device (110) to continue reception of a media stream over the WebRTC data channel only in response to a determination that the monitored buffer level is equal to or above a predefined buffer level.

NEE39. The second device (110) according to any one of the NEE33-NEE38, further comprising:
  a buffer monitoring module (BFR MTR) adapted to monitor a buffer level of a media buffer of the second device; and wherein the memory (MEM) stores computer program code which, when run in the processor (CTRL), causes the second device (110) to adjust a quality of the received media stream in dependence of the monitored buffer level of the media buffer.

NEE40. The second device (110) according to any one of the embodiments NEE33-NEE39, wherein a low-latency application is an application having a latency in the range of 0-5 seconds, particularly in the range of 0-3 seconds and preferably in the range of 0-2 seconds.

NEE41. A use of the second device (110) according to any one of embodiments NEE33-NEE40 in a gaming application.

NEE42. The use of the second device (110) according to embodiments NEE41, wherein the gaming application is a live casino gaming application.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while embodiments of the invention have been described with reference to gaming applications, the embodiments may equivalently be reduced into practice in other applications such as video conference applications to name only one additional example. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method of live streaming of media for low-latency applications, the method comprising:
   initiating broadcast of a media stream over a Web Real-Time Communications, WebRTC, data channel
   broadcasting the media stream over the WebRTC data channel to one or more receivers; and
   prior to initiating the broadcast of the media stream over the WebRTC data channel:
   monitoring a buffer state of a buffer; and
   in dependence of the monitored buffer state:
      determining whether the broadcast of the media stream over the WebRTC data channel is to be initiated.

2. The method according to claim 1, wherein the media stream comprises one or more media packets, wherein each media packet comprises a header and a media frame, and wherein the header comprises metadata and a time code.

3. The method according to claim 1, further comprising, prior to initiating the broadcast of the media stream over the WebRTC data channel:
   obtaining information related to one or more media formats supported by one or more receivers; and in dependence of the obtained information
   determining whether the broadcast of the media stream over the WebRTC data channel is to be initiated.

4. The method according to claim 1, wherein a low-latency application is an application having a latency in a range of 0-5 seconds.

5. A method of live streaming of media for low-latency applications, the method comprising:
   initiating reception of a media stream over a Web Real-Time Communications, WebRTC, data channel;
   receiving the media stream over the WebRTC data channel from a transmitter;
   monitoring a buffer level of a media buffer; and
   continuing said reception of the media stream over the WebRTC data channel in response to a determination that the monitored buffer level is equal to or above a predefined buffer level.

6. The method according to claim 5, wherein the media stream comprises one or more media packets, wherein each media packet comprises a header and a media frame, and wherein the header comprises metadata and a time code.

7. The method according to claim 6, further comprising:
   processing the header and the media frame of each received media packet separately.

8. The method according to claim 5, further comprising:
   monitoring a buffer level of a media buffer; and
   adjusting a quality of the received media stream in dependence of the monitored buffer level of the media buffer.

9. The method according to claim 5, wherein a low-latency application is an application having a latency in a range of 0-5 seconds.

10. A first device configured for live streaming of media for low-latency applications, the first device comprising:
    a transmitter;
    a processor;
    a memory storing computer program code which, when run in the processor, causes the first device to;
    prior to initiating a broadcast of a media stream over a WebRTC data channel, monitor a buffer state of a buffer: and in dependence of the monitored buffer state:
    determine whether the broadcast of the media stream over the WebRTC data channel is to be initiated, and
    initiate broadcast of a media stream over a Web Real-Time Communications, WebRTC, data channel; and
    wherein the transmitter is adapted to broadcast the media stream over the WebRTC data channel to one or more receivers.

11. The first device according to claim 10, wherein the media stream comprises one or more media packets, wherein each media packet comprises a header and a media frame, and wherein the header comprises metadata and a time code.

12. The first device according to claim 10, wherein the memory stores computer program code, which, when run in the processor causes the first device to, prior to initiating the broadcast of the media stream over the WebRTC data channel:
    obtain information related to one or more media formats supported by one or more receivers; and in dependence of the obtained information
    determine whether the broadcast of the media stream over the WebRTC data channel is to be initiated.

13. The first device according to claim 10, wherein a low-latency application is an application having a latency in a range of 0-5 seconds.

14. A second device configured for live streaming of media for low-latency applications, the second device comprising:
  a receiver;
  a processor;
  a buffer monitoring module adapted to monitor a buffer level of a media buffer of the second device;
  a memory storing computer program code which, when run in the processor, causes the second device to:
    initiate reception of a media stream over a Web Real-Time Communications, WebRTC, data channel, and
    continue reception of a media stream over the WebRTC data channel in response to a determination that the monitored buffer level is equal to or above a predefined buffer level; and
  wherein the receiver is adapted to receive the media stream over the WebRTC data channel from a transmitter.

15. The second device according to claim 14, wherein the media stream comprises one or more media packets, wherein each media packet comprises a header and a media frame; and wherein the header comprises metadata and a time code.

16. The second device according to claim 15, wherein the processor is adapted to process the header and the media frame of each received media packet separately.

17. The second device according to claim 14, further comprising:
  a buffer monitoring module adapted to monitor a buffer level of a media buffer of the second device; and wherein the memory stores computer program code which, when run in the processor, causes the second device to adjust a quality of the received media stream in dependence of the monitored buffer level of the media buffer.

18. The second device according to claim 14, wherein a low-latency application is an application having a latency in a range of 0-5 seconds.

19. A method of live streaming of media for low-latency applications, the method comprising:
  prior to initiating a broadcast of a media stream over a WebRTC data channel: obtaining information related to one or more media formats supported by one or more receivers, and
    in dependence of the obtained information, determining whether a broadcast of the media stream over the WebRTC data channel is to be initiated;
  initiating broadcast of a media stream over a Web Real-Time Communications, WebRTC, data channel; and
  broadcasting the media stream over the WebRTC data channel to one or more receivers.

20. The method according to claim 19, wherein the media stream comprises one or more media packets, wherein each media packet comprises a header and a media frame, and wherein the header comprises metadata and a time code.

21. The method according to claim 19, further comprising, prior to initiating the broadcast of the media stream over the WebRTC data channel:
  monitoring a buffer state of a buffer; and in dependence of the monitored buffer state
  determining whether the broadcast of the media stream over the WebRTC data channel is to be initiated.

22. The method according to claim 19, wherein a low-latency application is an application having a latency in a range of 0-5 seconds.

23. A method of live streaming of media for low-latency applications, the method comprising:
  initiating broadcast of a media stream over a Web Real-Time Communications, WebRTC, data channel; and
  broadcasting the media stream over the WebRTC data channel to one or more receivers, and
  wherein a low-latency application is an application having a latency in a range of 0-5 seconds.

24. The method according to claim 23, wherein the media stream comprises one or more media packets, wherein each media packet comprises a header and a media frame, and wherein the header comprises metadata and a time code.

25. The method according to claim 23, further comprising, prior to initiating the broadcast of the media stream over the WebRTC data channel:
  monitoring a buffer state of a buffer; and in dependence of the monitored buffer state
  determining whether the broadcast of the media stream over the WebRTC data channel is to be initiated.

26. The method according to claim 23, further comprising, prior to initiating the broadcast of the media stream over the WebRTC data channel:
  obtaining information related to one or more media formats supported by one or more receivers; and in dependence of the obtained information
  determining whether the broadcast of the media stream over the WebRTC data channel is to be initiated.

27. A method of live streaming of media for low-latency applications, the method comprising:
  initiating reception of a media stream over a Web Real-Time Communications, WebRTC, data channel; and
  receiving the media stream over the WebRTC data channel from a transmitter, and
  wherein a low-latency application is an application having a latency in a range of 0-5 seconds.

28. The method according to claim 27, wherein the media stream comprises one or more media packets, wherein each media packet comprises a header and a media frame, and wherein the header comprises metadata and a time code.

29. The method according to claim 28, further comprising:
  processing the header and the media frame of each received media packet separately.

30. The method according to claim 27, further comprising:
  monitoring a buffer level of a media buffer; and
  continuing said reception of the media stream over the WebRTC data channel only in response to a determination that the monitored buffer level is equal to or above a predefined buffer level.

31. The method according to claim 27, further comprising:
  monitoring a buffer level of a media buffer; and
  adjusting a quality of the received media stream in dependence of the monitored buffer level of the media buffer.

32. A first device configured for live streaming of media for low-latency applications, the first device comprising:
  a transmitter;
  a processor;
  a memory storing computer program code which, when run in the processor, causes the first device to:
  prior to initiating a broadcast of a media stream over a WebRTC data channel:
    obtain information related to one or more media formats supported by one or more receivers, in dependence of the obtained information, determine whether the broadcast of the media stream over the WebRTC data channel is to be initiated, and initiate broadcast of a media stream over a Web Real-Time Communications, WebRTC, data channel; and wherein the transmitter is adapted to broadcast the media stream over the WebRTC data channel to one or more receivers.

33. The first device according to claim 32, wherein the media stream comprises one or several media packets, wherein each media packet comprises a header and a media frame, and wherein the header comprises metadata and a time code.

34. The first device according to claim 32, wherein the memory stores computer program code, which, when run in the processor causes the first device to, prior to initiating the broadcast of the media stream over the WebRTC data channel:

monitor a buffer state of a buffer; and in dependence of the monitored buffer state determine whether the broadcast of the media stream over the WebRTC data channel is to be initiated.

35. The first device according to claim 32, wherein a low-latency application is an application having a latency in a range of 0-5 seconds.

36. A first device configured for live streaming of media for low-latency applications, the first device comprising:

a transmitter;

a processor; and a memory storing computer program code which, when run in the processor, causes the first device to initiate broadcast of a media stream over a Web Real-Time Communications, WebRTC, data channel; and wherein the transmitter is adapted to broadcast the media stream over the WebRTC data channel to one or more receivers, and a low-latency application is an application having a latency in a range of 0-5 seconds.

37. The first device according to claim 36, wherein the media stream comprises one or several media packets, wherein each media packet comprises a header and a media frame, and wherein the header comprises metadata and a time code.

38. The first device according to claim 36, wherein the memory stores computer program code, which, when run in the processor causes the first device to, prior to initiating the broadcast of the media stream over the WebRTC data channel:

monitor a buffer state of a buffer; and in dependence of the monitored buffer state determine whether the broadcast of the media stream over the WebRTC data channel is to be initiated.

39. The first device according to claim 36, wherein the memory stores computer program code, which, when run in the processor causes the first device to, prior to initiating the broadcast of the media stream over the WebRTC data channel:

obtain information related to one or more media formats supported by one or more receivers; and in dependence of the obtained information determine whether the broadcast of the media stream over the WebRTC data channel is to be initiated.

40. A second device configured for live streaming of media for low-latency applications, the second device comprising:

a receiver;

a processor; and a memory storing computer program code which, when run in the processor, causes the second device to initiate reception of a media stream over a Web Real-Time Communications, WebRTC, data channel; and wherein the receiver adapted to receive the media stream over the WebRTC data channel from a transmitter, and wherein a low-latency application is an application having a latency in a range of 0-5 seconds.

41. The second device according to claim 40, wherein the media stream comprises one or several media packets, wherein each media packet comprises a header and a media frame; and wherein the header comprises metadata and a time code.

42. The second device according to claim 41, wherein the processor is adapted to process the header and the media frame of each received media packet separately.

43. The second device according to claim 40, further comprising:

a buffer monitoring module adapted to monitor a buffer level of a media buffer of the second device; and wherein the memory stores computer program code which, when run in the processor, causes the second device to continue reception of a media stream over the WebRTC data channel only in response to a determination that the monitored buffer level is equal to or above a predefined buffer level.

44. The second device according to claim 40, further comprising:

a buffer monitoring module adapted to monitor a buffer level of a media buffer of the second device; and wherein the memory stores computer program code which, when run in the processor, causes the second device to adjust a quality of the received media stream in dependence of the monitored buffer level of the media buffer.

* * * * *